(12) United States Patent
El-Moursy et al.

(10) Patent No.: US 8,677,361 B2
(45) Date of Patent: Mar. 18, 2014

(54) SCHEDULING THREADS BASED ON AN ACTUAL POWER CONSUMPTION AND A PREDICTED NEW POWER CONSUMPTION

(75) Inventors: Ali A. El-Moursy, Giza (EG); Hisham E. Elshishiny, Cairo (EG); Ahmed T. Sayed Gamal El Din, Giza (EG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/247,878

(22) Filed: Sep. 28, 2011
(Under 37 CFR 1.47)

(65) Prior Publication Data
US 2012/0192195 A1 Jul. 26, 2012

(30) Foreign Application Priority Data
Sep. 30, 2010 (EP) ..................... 10183336

(51) Int. Cl.
*G06F 9/48* (2006.01)
(52) U.S. Cl.
USPC .......................... 718/100; 718/108
(58) Field of Classification Search
USPC .......................... 718/100; 713/320
See application file for complete search history.

(56) References Cited

U.S. PATENT DOCUMENTS

| | | | |
|---|---|---|---|
| 6,658,447 B2 * | 12/2003 | Cota-Robles ................. | 718/103 |
| 6,948,082 B2 | 9/2005 | Gschwind et al. | |
| 7,197,652 B2 | 3/2007 | Keller, Jr. et al. | |
| 7,437,581 B2 * | 10/2008 | Grochowski et al. ......... | 713/320 |
| 7,596,430 B2 | 9/2009 | Aguilar, Jr. et al. | |
| 7,653,906 B2 | 1/2010 | Chen et al. | |
| 8,001,549 B2 * | 8/2011 | Henmi .......................... | 718/108 |
| 8,095,806 B2 | 1/2012 | Suh et al. | |
| 8,195,962 B2 * | 6/2012 | Naffziger et al. ............. | 713/300 |
| 2003/0115239 A1 | 6/2003 | Togawa | |
| 2003/0126476 A1 | 7/2003 | Greene | |
| 2003/0131269 A1 | 7/2003 | Mizyuabu et al. | |

(Continued)

FOREIGN PATENT DOCUMENTS

WO 2007128168 11/2007

OTHER PUBLICATIONS

Bautista, D., J. Sahuquillo, H. Hassan, S. Petit, and J. Duato, "A Simple Power-Aware Scheduling for Multicore Systems when Running Real-Time Applications", © 2008 IEEE, Total 7 pp.

(Continued)

*Primary Examiner* — Emerson Puente
*Assistant Examiner* — Charlie Sun
(74) *Attorney, Agent, or Firm* — Konrad Raynes Davda & Victor LLP; Janaki K. Davda (57) ABSTRACT

Scheduling threads in a multi-threaded/multi-core processor having a given instruction window, and scheduling a predefined number N of threads among a set of M active threads in each context switch interval are provided. The actual power consumption of each running thread during a given context switch interval is determined, and a predefined priority level is associated with each thread among the active threads based on the actual power consumption determined for the threads. The power consumption expected for each active thread during the next context switch interval in the current instruction window (CIW_Power_Th) is predicted, and a set of threads to be scheduled among the active threads are selected from the priority level associated with each active thread and the power consumption predicted for each active thread in the current instruction window.

20 Claims, 6 Drawing Sheets

(56) References Cited

U.S. PATENT DOCUMENTS

| | | |
|---|---|---|
| 2004/0128663 A1 | 7/2004 | Rotem |
| 2004/0158831 A1 | 8/2004 | Amano et al. |
| 2005/0120254 A1 | 6/2005 | Suzuoki et al. |
| 2005/0149937 A1 | 7/2005 | Pilkington |
| 2005/0278520 A1 | 12/2005 | Hirai et al. |
| 2006/0053323 A1 | 3/2006 | Kissell |
| 2006/0107262 A1* | 5/2006 | Bodas et al. ............... 718/100 |
| 2006/0236136 A1* | 10/2006 | Jones ........................ 713/300 |
| 2007/0106990 A1* | 5/2007 | Kissell ...................... 718/102 |
| 2008/0222434 A1 | 9/2008 | Shimizu et al. |
| 2009/0064164 A1 | 3/2009 | Bose et al. |
| 2009/0070607 A1 | 3/2009 | Safford et al. |
| 2009/0217277 A1 | 8/2009 | Johnson et al. |
| 2009/0249094 A1 | 10/2009 | Marshall et al. |
| 2009/0307708 A1 | 12/2009 | Archer et al. |
| 2009/0328047 A1 | 12/2009 | Li et al. |
| 2009/0328055 A1 | 12/2009 | Bose et al. |
| 2010/0281483 A1* | 11/2010 | Rakib et al. ................ 718/102 |
| 2011/0022869 A1 | 1/2011 | Rozen et al. |

OTHER PUBLICATIONS

Lawson, B. and E. Smirni, "Power-aware Resource Allocation in High-end Systems via Online Simulation", © 2005, ACM, Total 10 pp.

Lu, Y., L. Benini , and, G.D. Micheli, "Operating-System Directed Power Reduction", 2000 ACM, Total 6 pp.

Deitel, P.J., H.M. Deitel, J.A. Listfield, T.R. Nieto, C.H. Yaeger, and M. Zlatkina, "Thread Priorities and Thread Scheduling", Feb. 28, 2003, [online], [Retrieved on Mar. 18, 2010]. Retrieved from the Internet at <URL: http://www.informit.com/articles/printerfriendly.aspx?p=31093>, Total 5 pp.

Pouwelse, J., K. Langendoen, and H. Sips, "Energy Priority Scheduling for Variable Voltage Processors", © 2001 ACM, Total 6 pp.

Quan, G., and X. Hu, "Energy Efficient Fixed-Priority Scheduling for Real-Time Systems on Variable Voltage Processors", © 2001 ACM, Total 6 pp.

Rajagopalan, M., B.T. Lewis, and T.A. Anderson, "Thread Scheduling for Multi-Core Platforms", 2007, Total 6 pp. (Also available at: http://www.usenix.org/event/hotos07/tech/full_papers/rajagopalan/rajagopalan.pdf).

Singh, K., M. Bhadauria, and S.A. McKee, "Real Time Power Estimation and Thread Scheduling via Performance Counters", ACM SIGARCH Computer Architecture News, vol. 37, No. 2, May 2009, Total 10 pp.

Uhrig, S., "Evaluation of Different Multithreaded and Multicore Processor Configurations for SoPC", 9 Springer-Verlag Berlin Heidelberg 2009, Total 10 pp. (Also available at: http://www.springerlink.com/content/vjj852n673320wm2/).

U.S. Patent Application, entitled "Scheduling Threads in a Processor", invented by El-Moursy, A.A., H.E. Elshishiny, and A.T. Sayed Gamal El Din, Total 33 pp.

Response to Office Action 1 for U.S. Appl. No. 13/247,887, dated Sep. 13, 2013, 14 pp. [57.249 (ROA1)].

Notice of Allowance for U.S. Appl. No. 13/247,887, dated Oct. 2, 2013, 21 pp. [57.249 (NOA1)].

Office Action 1, Jun. 14, 2013, for U.S. Appl. No. 13/247,887, filed Sep. 28, 2011 by H.E. Elshishiny et al., Total 22 pp. [57.249 (OA1)].

\* cited by examiner

SCHEDULING THREADS BASED ON AN ACTUAL POWER CONSUMPTION AND A PREDICTED NEW POWER CONSUMPTION

CROSS-REFERENCE TO RELATED FOREIGN APPLICATION

This application is a non-provisional application that claims priority benefits under Title 35, United States Code, Section 119(a)-(d) or Section 365(b) of European (EP) Patent Application No. 10183336.6, filed on Sep. 30, 2010, by Ali A. El-Moursy, Hisham E. Elshishiny, and Ahmed T. Sayed Gamal El Din, which application is incorporated herein by reference in its entirety.

FIELD OF THE INVENTION

The present invention generally relates to computer systems and specifically to a method and system for scheduling threads in a multi-threaded/multi-core processor.

BACKGROUND OF THE INVENTION

As use of computer systems becomes more pervasive, there is a growing need to limit energy consumption of computers. Computer energy consumption impacts the design and usage models of computer systems of any kind, such as mobile devices, hand-held PDAs, laptops or also farms of computer clusters and data centers.

As well known, energy is directly proportional to power consumption. Power consumption can be limited for example by a budget of energy, either imposed by the power station, by a real budget for electric energy/power or even by the battery life in case of mobile and wireless computing. Power consumption is characterized by average power and peak power. The average power affects energy consumption and is dependent to a great extent on the workload a machine is executing, while peak power has a very important effect on power delivery network design and reliability. When peak power occurs to be beyond a certain limit in an integrated chip (IC), the power delivery network associated with it fails, thereby causing permanent damages. Such power delivery network failure is mainly due to high current density causing electro-migration in the metal lines, which in turn causes a power spiral resulting in the breaking of metal lines and in functional failure.

The ICs in a computer system have the highest power consumption among the different computer components, and are accordingly more likely to crush. Microprocessors are the largest computer ICs and comprise a high density of transistors on a single chip for facilitating high level of integration of multiple core and hardware threads, which makes achieving low power designs particularly challenging. This is the main cause of the high power consumption of the highly dense multi-core/multi-threaded microprocessors. There is accordingly a need to manage microprocessors' high activities to save energy and/or increase reliability and in particular job scheduling activities which facilitates a high level of utilization of the multi-core/multi-threaded hardware structures, through simultaneously running of many software threads.

One known approach to this problem is the one taken in US2006/107,262. US 2006/107,262 provides a thread scheduling technique for multi-core systems relying on the compiler to classify the threads as complex/high power or simple/low power, then schedule threads to run on the different cores by distributing the threads on the cores in a way that reduces the power/thermal density. However, US2006/107,262 is not adapted to multi-threaded processors in which more than one thread runs on each core. Further, US20060107262 considers that a thread has a fixed power consumption behaviour over its life cycle, so that the compiler can classify the thread to either high or low power, and thereby does not take into account the variation of the power consumption of each thread during its execution.

There is accordingly a need for a job scheduling method and system in a multi-core/multi-threaded processor that lowers peak power and average power levels.

SUMMARY OF THE INVENTION

According to the present invention there is provided a method of scheduling threads in a processor according to the appended independent claim 1, a computer program product according to the appended claim 11, a computer readable medium according to the appended claim 11, and a system according to the appended claim 16. Preferred embodiments are defined in the appended dependent claims 2 to 10.

In accordance with the various embodiments of the invention, the selection of threads that are to be simultaneously executed on a multi-core/multi-threaded microprocessor is managed in a way that lowers peak power and average power levels. This accordingly increases the reliability of the processor.

It is another advantage of the invention to provide a job scheduling method that is adapted to any number of threads or cores. The solution of the invention can be easily implemented using Kernel Software capabilities and available hardware resources.

The invention further guarantees the forward progress of each thread therefore avoiding thread starvation.

BRIEF DESCRIPTION OF THE DRAWINGS

Embodiments of the present invention will now be described by way of example with reference to the accompanying drawings in which like references denote similar elements, and in which.

The drawings are intended to depict only typical embodiments of the invention, and therefore should not be considered as limiting the scope of the invention.

DETAILED DESCRIPTION

According to a preferred embodiment there is provided a method and a system of guiding thread scheduling in a multi-core and/or multi-threaded microprocessor. The job scheduling system is adapted to assign priorities or priority levels to the different active threads of applications/jobs running, based on their power consumption history and expected values in the coming context switch time period. As well known in the art, a "Context Switch time period" or "Context Switch interval" represents a period during which a group of applications or threads are scheduled to run on the computer processors for example by the Operating System. In accordance with the various embodiments of the invention, a subset of these threads is selected for scheduling based on the priorities levels assigned to the active threads. More specifically, the priority levels are assigned to the threads based on the expected power consumption, and the selected threads will be used to populate a scheduling data structure for the next Context Switch interval. The job scheduling method according to embodiments of the invention applies predefined criteria or conditions to select threads for scheduling, one of such condition comprising determining if a candidate thread has an expected power consumption value below a predefined threshold. Other criteria can be used additionally to select the set of candidate threads to be scheduled, such as job starting times, or job scheduling delays (when a job has been delayed) or criticality of job progress. The actual power consumed by each thread is previously estimated and used to maintain a thread power consumption history data structure, which is used to make the selection decision for the coming Context Switch interval. According to an aspect of the invention, threads are sorted in an ascending order based on their accumulative history of the power consumption, which means that threads not selected for one or more Context Switch intervals will have their priorities elevated to be the highest in the upcoming Context Switch intervals. This dynamic change in priority of the threads both guarantees the forward progress of each thread and at the same time increases the likelihood that the processor will always run on lower peak power and also lower average power levels. Selecting threads with the lowest accumulative power in multi-threaded processors has the advantage of reducing both the peak and average power on the core level while in single threaded multi-core processors this will have the same effect on a chip level.

Temporal relative terms, such as "next", "coming", "upcoming", "current", "last", "previous" will be used herein for ease of description to describe a context switch interval in relationship to another context switch interval. It will be understood that these temporal relative terms are intended to encompass consecutive context switch intervals according to a timeline reference. Further, unless otherwise defined, "next" and "coming" and "upcoming" on the one hand, or "last" and "previous" on the other hand are used herein in relation with a context switch interval have the same meaning To facilitate understanding of certain embodiments of the present invention, there follows definitions of expressions, parameters or notations used in the detailed description:

P designates the number of active jobs/threads in the system. Only sub-set N of the P jobs/threads could run simultaneously on the processor.

k is an index representing one of the active jobs/threads by the Operating system (OS), and ranging from zero to P−1.

N designates the number of jobs/threads that an N-Way Multi-core/multi-threaded processor can run on an N Hardware contexts or logical processors simultaneously.

j is an index representing one of the jobs/threads run by the Operating system, and ranging from zero to N−1.

CS_intrv represents the number of cycles for context switch interval/Time Quanta An Instruction Window (IW) designates a predefined number that at least covers duration of a Context Switch interval.

A Current Instruction Window (CIW) represents the sequence of instructions to be executed starting from the last executed instruction to the predefined number of instructions defined by the Instruction Window (IW).

A Thread Trace designates a trace that is collected for each thread/job running on the system to identify the sequence of instructions executed for each Instruction window.

The Current Instruction Window Counter (CIW counter) represents a counter per thread that point out where in a thread trace, the corresponding thread is currently executing in the current CS interval. CIW counter is incremented with each instruction committed from the thread.

Figure 1:
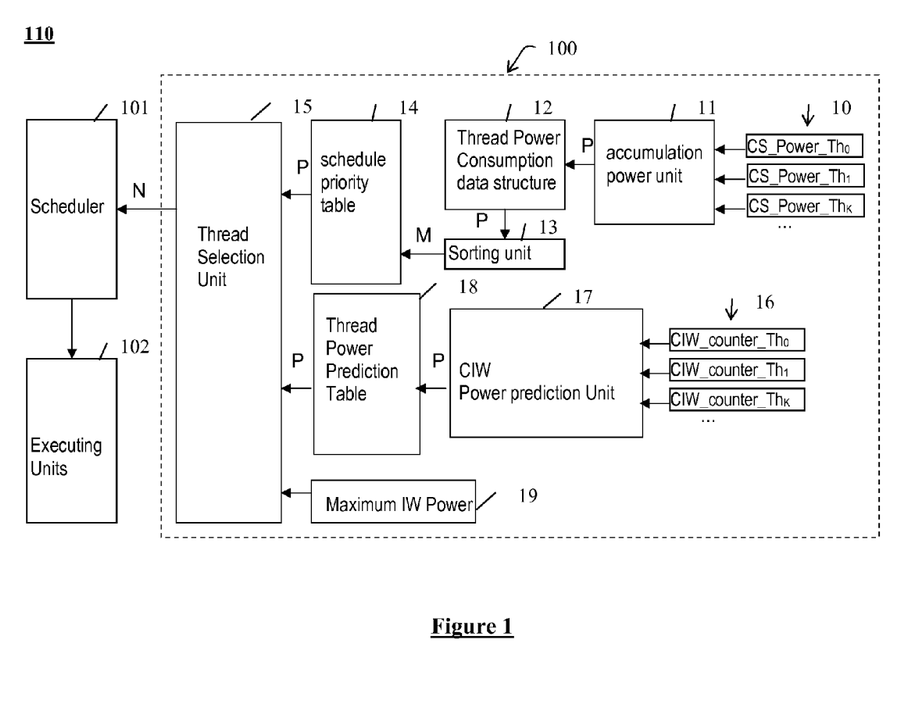
FIG. 1 schematically illustrates a job scheduling system used to schedule jobs/threads in an N-way processor according to certain embodiments of the invention.

FIG. 1 shows a hardware configuration of a job scheduling system 100 for scheduling jobs in a processor 110, in accordance with an embodiment of the invention. The job scheduling system 100 (also referred to thereinafter as a thread scheduling system) is adapted to run a total number of P active jobs/threads in the system.

The processor 110 is an N-Way multithreaded or multi-core processor comprising N threads out of the P active threads which are selected to run every Context Switch. N represents the number of jobs/threads among the P active threads that could run simultaneously in the processor 110 on N Hardware contexts or logical processors.

The Operating System may schedule N jobs/threads on such processor for a given context switch interval/Time Quanta. Indeed, during a context switch interval, the Operating System selects N active jobs/threads to schedule them to run on the processor 110 out of the P active jobs/threads. If the P active jobs/threads are less than N, the Operating System will schedule all running jobs/threads to run on the processor. If P active jobs/threads are more than N, the Operating System will select a sub-set N of jobs/threads to schedule them for running on the processor.

The job scheduling system 100 comprises a thread power consumption register 10 (also referred to as "CS_Power_Th$_j$") providing the actual power consumption of each thread j that has run during the previous context switch interval.

The context switch registers 10 therefore maintain the power consumption values of the N threads that have run in the previous Context Switch. At the end of a Context switch, an accumulation power unit 11, also referred to thereinafter as "Accumulate_Power_Th", accumulates the power consumption CS_Power_Thj for each corresponding thread over the thread life cycle since thread k is in active mode, and maintains the accumulated values in an accumulative thread Power Consumption data structure 12, designated thereinafter as "Accumulate_Power_Th$_k$". The accumulative thread Power Consumption data structure 12 thereby provides for each active thread k the actual power consumed for the thread life cycle since thread k is in active mode. The accumulative thread Power Consumption data structure 12 may be a table comprising an entry per active thread (P entries), each entry storing the actual consumed power for the thread life cycle since the thread is in active mode. The following specification will be made with reference to an accumulative thread Power Consumption data structure 12 represented as a table for illustrative purpose only.

The job scheduling system 100 also comprises a schedule priority data structure 14, also referred to thereinafter as "Power_Priority", which associates sets of threads among the P active threads with respective priority levels based on the information maintained in the accumulative thread Power Consumption table 12. The schedule priority data structure 14 may be in particular a table comprising multiple entries per priority level, each entry storing a list of job/thread identifiers representing the threads that have the same priority level. The following specification will be made with reference to a schedule priority data structure 14 represented as table for illustrative purpose only.

In accordance with the embodiments of the invention, the job scheduling method determines from the accumulative thread Power Consumption table 12 the group of threads that have the same accumulative thread power consumption value, and assign them the same priority level in the Schedule Priority Table 14. A thread is thereby associated with a priority level in the schedule priority table 14 based on its power consumption history.

In preferred embodiments of the invention, the schedule priority table 13 is sorted from the highest to the lowest priority threads using a sorting unit 12. The sorting unit 12 may sort power consumption history from the accumulative thread Power Consumption table 13 before populating the schedule power priority table 14. The total number of priority levels in the schedule priority table 14 will be designated thereinafter as "M", and the index representing a priority level assigned to a group of jobs/threads will be designated as "i", where i ranges from zero to M.

The job scheduling system 100 according to the invention comprises a thread selection unit 15 for selecting the highest priority N threads to execute for the next context switch interval on the multi-core multi-threaded 110 based on the information maintained in the schedule priority table 14 and prediction information maintained by a power prediction unit 17.

The power prediction unit 17 estimates the power consumption expected for each thread k in the Current Instruction Window (CIW). The Instruction Window (IW) designates a predefined number that covers at least the duration of a Context Switch interval. The Instruction Window can be defined during the workload trace collection using workload profiling. The Current Instruction Window (CIW) represents the sequence of instructions to be executed starting from the last executed instruction up to the predefined number of instructions IW.

To estimate (or predict) the power consumption expected for each thread k in the Current Instruction Window (CIW), the power prediction unit 17 uses information provide by thread estimated power consumption Registers 16 provided for each thread k (among the P active threads) to maintain an estimate (designated as $CIW\_Power\_Th_k$) of the power consumed by the thread for the Current Instruction Window (CIW).

The estimates calculated by the power prediction unit 17 are maintained in a Thread Power Prediction data structure 18, such as a list. The Thread Power Prediction data structure 18 comprises an entry per active thread (P), and each entry stores the power consumption estimated for the corresponding thread for the Current Instruction Window $CIW\_Power\_Th_k$.

The thread selection unit 15 is further adapted to solve selection conflict, such as for example if two threads in a priority level i the same accumulative power consumption history while at maximum N threads can be selected to run. As the thread selection in accordance with the various embodiments of the invention is based on the accumulative history of power consumption, threads selected for execution will have higher Accumulate_Power_Th values while threads not selected will remain at their current Accumulate_Power_Th values. Accordingly, priority of non selected threads in the current Context Switch interval will elevate automatically. Since for the following Context Switch intervals the thread not selected in the current Context Switch will eventually be selected, the thread selection unit 15 may randomly select any of the candidate among the equal priority threads to discriminate the equal priority threads. Alternatively, the thread selection unit 15 may apply predefined criteria to discriminate between equal priority threads in case of conflicts, such as for example the time when the jobs started, or how long have the job been delayed or the criticality of job progress. The criticality of job progress could have an important impact in the case of real time embedded systems. In such cases, the job scheduling system 100 can compare the execution time to the Worst Case Execution Time (WCET) and resolve the selection conflict.

In order to guarantee that the selected threads to execute will not exceed a predefined peak power limit 19, referred to as Max_IW_Power, when scheduling threads that are to be executed in the current Context Switch interval, the CIW power prediction unit 17 is further configured to identify which threads are expected to cause such violation and prevent the scheduling of theses identified thread for the current Context Switch.

The power threshold Max_IW_Power accordingly represents the threshold power value that should not be exceeded for the power level per Instruction Window for all running jobs/threads in the context switch interval. This maximum could be defined during the trace collection process by calculating the maximum power level each job/thread could consume in any particular Context switch interval.

Figure 2:
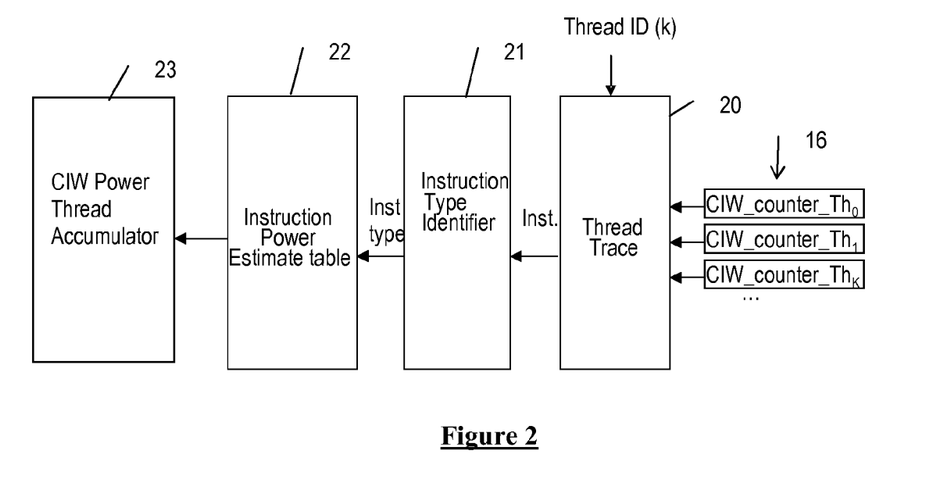
FIG. 2 schematically illustrates the power prediction unit according to certain embodiments.

FIG. 2 schematically shows the structure of the CIW power prediction unit 17 in accordance with certain embodiments of the invention.

When threads are executed, thread progress defined by the number of committed instructions is reflected in the CIW counters 16. For every thread k, a trace data structure 20 (also referred to as "trace" or "thread trace" thereinafter) is provided to identify the instructions that are expected to be run for the upcoming Instruction Window. Traces 20 may be collected offline in a profiling phase before even running the threads and maintained in a suitable memory space to be used for the power estimate purpose. Each thread trace represents a sequence of assembly language instructions used by the thread throughout its lifetime. This sequence is the result of executing the output of the compiler on the microprocessor. For example, running a workload of a database application would be essentially running a set of predefined jobs/threads that represent that workload, containing the assembly instructions that are needed to perform the functions of the software. The assembly language instructions are the ones that the microprocessor supports in its instruction set architecture (ISA). The ISA is divided into different sections depending on the instruction type and/or other criteria; like addressing modes. The thread trace is used by the job scheduling system according to certain embodiments of the invention to identify instructions and their types that are expected to execute within the lifetime of each thread k. Each thread is associated with a thread identifier ThreadID.

For each thread k, the instructions expected to be run for that thread during the coming Instruction Window are identified from the thread trace 20 and then passed to an instruction type identifier 21 which decodes each instruction identified for thread k and identify its type. The power prediction unit 15 further comprises an instruction power estimate data structure 22, such as a look-up table, which maintains estimates of the power consumption Pj for each instruction type. To maintain such power prediction unit 15, each instruction in the instruction set architecture (ISA) of that microprocessor may be involved in a power measurement process during a microprocessor benchmarking/testing phase to estimate its power consumption level by developing small routines to exercise each instruction and measure the power consumed. Based on the instruction types identified from the thread trace 20 for each thread k, the table 22 is searched to provide instruction type power estimates. The information maintained in the instruction power estimate data structure 22 is system dependent and could be easily gathered during system characterization operation to be performed by the OS for example at OS installation on the system.

Power estimates Pj retrieved from the instruction power estimate table 22 for the instructions of each thread k in the current instruction window are then accumulated in a power thread Accumulator 23 (also designated as $CIW\_Power\_th_k$). This provides P accumulator values $CIW\_Power\_th_k$ each one being associated with a given thread k (k=1 to P).

The accumulator values 23 are then added to a thread power prediction table 18.

Turning back to FIG. 1, the thread selection unit 15 selects the N highest priority level threads from the schedule priority table 14 (representing the N threads having the lowest priority), and then uses them as indexes to the thread power prediction unit 18. The total power consumption S expected for the N highest priority level threads is then computed for each instruction window (by summing for each instruction window the corresponding values of the N threads).

The thread selection unit 15 then determines if the total power consumption $P_{IW}$ (also referred to as total power consumption indicator) obtained for each instruction window IW over the N candidate threads is less than the maximum threshold defined for the corresponding instruction window Max_Power_IW, and if not the thread selection unit 15 replaces one or more threads among the N candidate threads. The N selected threads are then scheduled by scheduler 101 and executed by execution units 102.

The same process is repeated every Context Switch.

The selection of the threads having the lowest accumulative power in a multi-threaded/multi-core processor makes it possible to reduce both the peak and average power on the core level while in a single threaded multi-core processor, it provides the same effect on a chip level. The invention accordingly applies to any combination of multi-threaded/multi-core processors.

Figure 3:
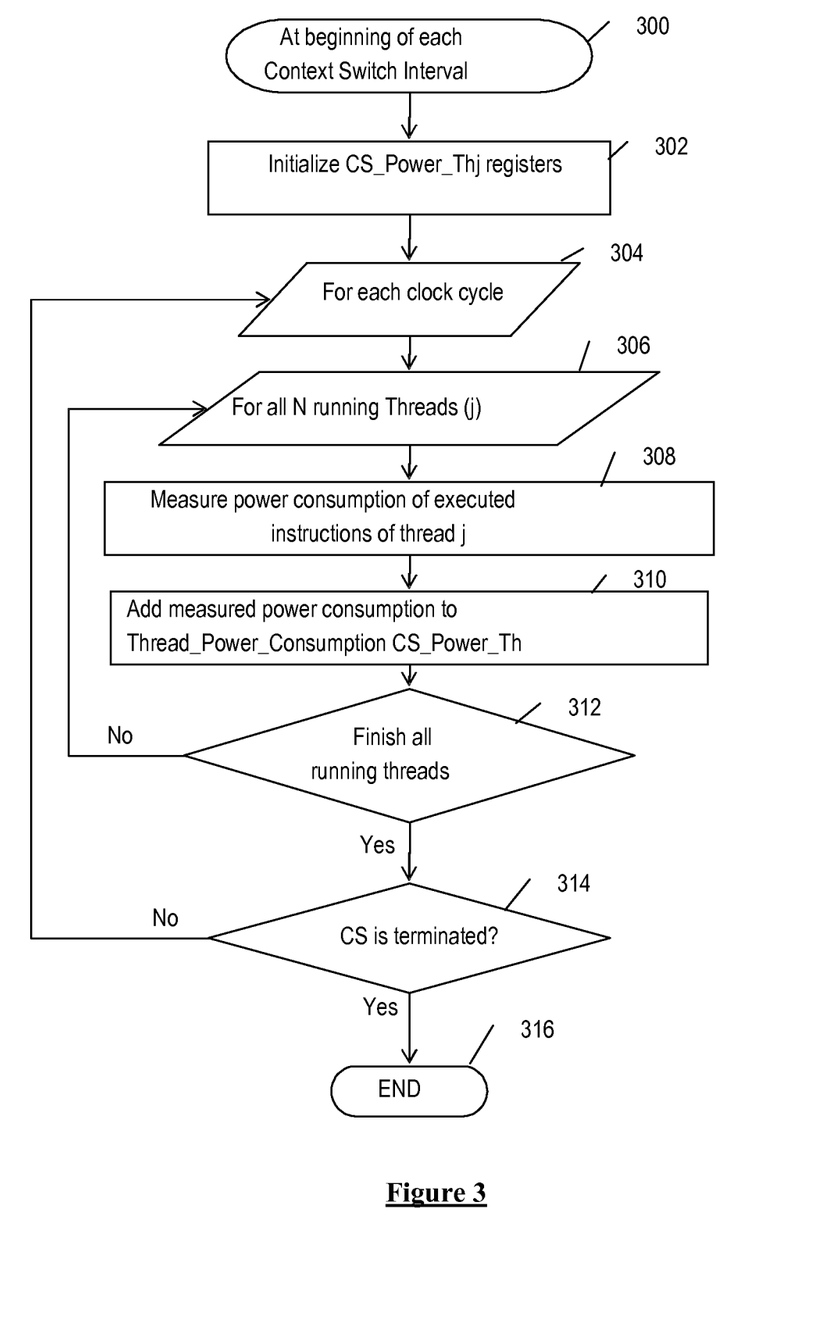
FIG. 3 shows a flowchart for estimating the actual power consumption per thread of instructions within the life cycle of an instruction.

FIG. 3 shows a flowchart for determining the actual power consumed during each context switch interval according to an embodiment of the invention, where the context switch register 10 represent power measurement registers.

The process starts at the beginning of each context switch interval in step 300. The process may be started alternatively every T context switch intervals, where T is a predefined number. In step 302, the power registers (or counters) 10 are initialized. In one embodiment of the invention, the registers 10 may be set to zero. The power registers will be used to measure the power consumed by the instructions executed for each thread k during the context switch CS.

After the initializing step 302, for each clock cycle (step 304), all the running threads are processed. More specifically, for each running thread j (selected in step 306), the power consumption of the executed instructions of that thread j is measured in step 308.

In step 310, the measured values are then added to the $CS\_Power\_Th_j$ register 10 corresponding to thread j. The actual power consumptions per thread maintained in the context switch registers 10 will be used for comparison with the coming Context Switch for thread selection. Steps 306 to 310 are repeated for all running threads. When all the running threads have been processed (condition checked in step 312), it is determined in step 314 if the current context switch interval CS_intry is completed. If not, steps 304 to 312 are repeated for the next clock cycle. Otherwise, the process ends in step 316.

Figure 4:
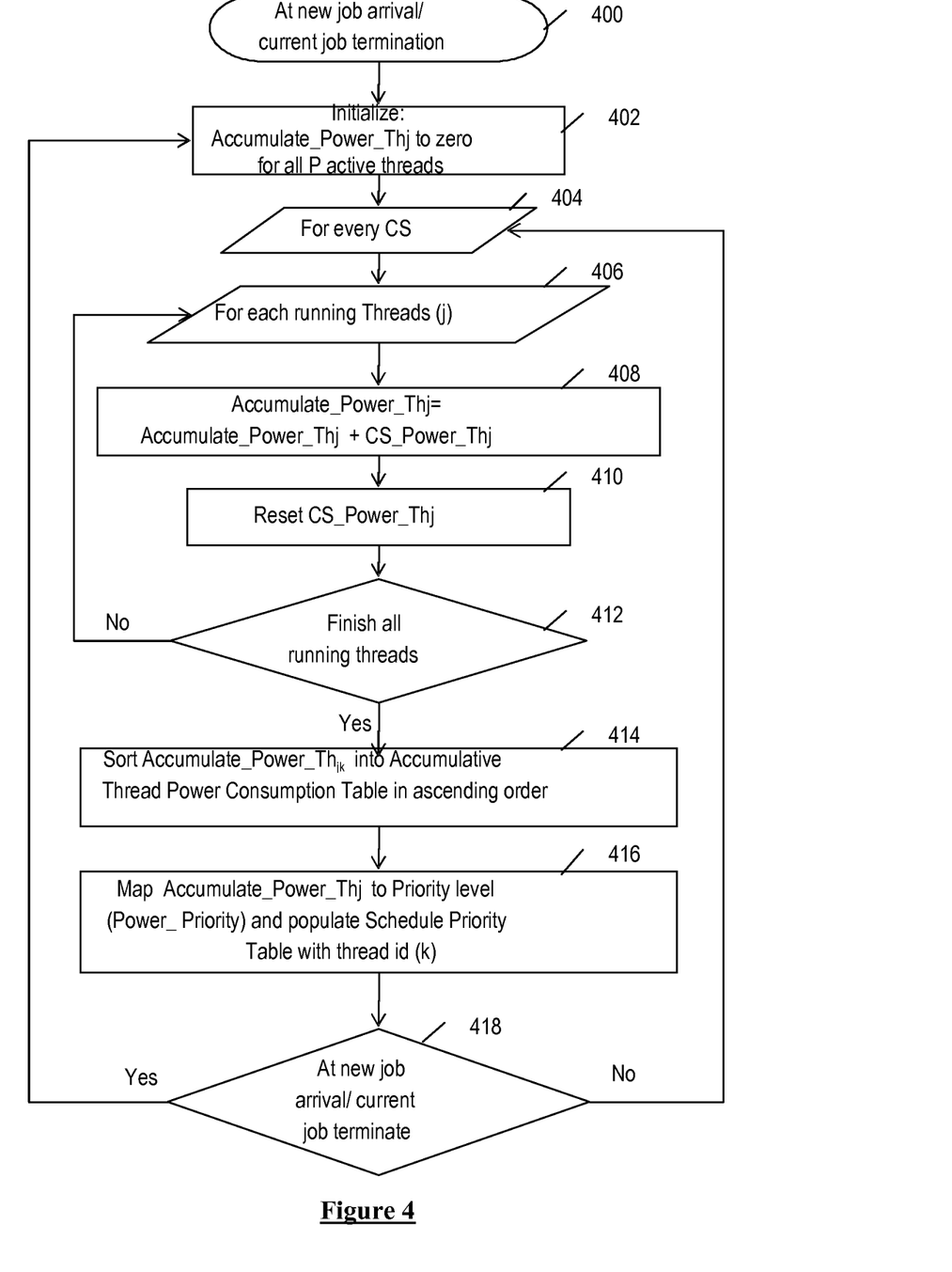
FIG. 4 shows a flowchart for prioritizing threads based on their history of power consumption according to certain embodiments.

FIG. 4 shows a flowchart for prioritizing jobs/threads based on their history of power consumption.

The process starts in step 400 with a job arrival/termination.

In step 402, the P power consumption accumulators (Accumulate_Power_Tj) associated with each active thread/job k in the accumulative thread power consumption table 12 are initialized, by setting them to zero.

For each context switch CS detected in step 404, and for each running thread j (step 406) among the N running threads, the actual thread power consumption $CS\_Power\_Th_j$ maintain in the corresponding context switch register 10 is added to the current value of the corresponding entry $Accumulate\_Power\_Th_j$ of the Accumulative Thread Power Consumption Table 14, in step 408, as follows:

$$Accumulate\_Power\_Thj = CS\_Power\_Th_j + Accumulate\_Power\_Thj$$

In step 410, the corresponding context switch register $CS\_Power\_Th_j$ for thread j is reset to prepare them for the next CS interval.

If not all the running threads j have been processed (condition checked in step 412), the next thread is processed by repeating steps 406 to 412.

When all the running threads have been processed, step 414 sorts the Thread Power Consumption Table 12 in ascending order. Accordingly, the Thread Power Consumption Table 12 is ordered based on the thread actual power consumption.

In step 416, each thread k among the running threads is mapped to a given priority level among a set of priority levels based on its power consumption $Accumulate\_Power\_Th_j$ in the Thread Power Consumption Table 12, and the thread identifier "k" is used to populate the schedule priority table 14. The Schedule Priority table 14 thereby comprises different priority levels i, each priority level i being associated with one or more threads/jobs based on the thread/job Power Consumption maintained in table 12. The thread priority is determined from the Thread Power consumption level so that the lower the power consumption for a thread the higher the thread priority. Thread priority level may be only used to account for threads that consume the exact same amount of power. For example, if two threads r and s have equal power consumption ($Accumulate\_Power\_Th_r = Accumulate\_Power\_Th_s$), those two threads can be assigned the same priority level. If the two threads r and s have respective power consumptions $Accumulate\_Power\_Th_r$ and $Accumulate\_Power\_Th_s$ with $Accumulate\_Power\_Th_r < Accumulate\_Power\_Th_s$, and all other threads consume power either greater than $Accumulate\_Power\_Th_s$ or less than $Accumulate\_Power\_Th_r$, then thread r could be assigned a priority level i and thread s a priority level i+1.

The process is repeated until the next job arrival/termination event is detected (step 418).

Figure 5:
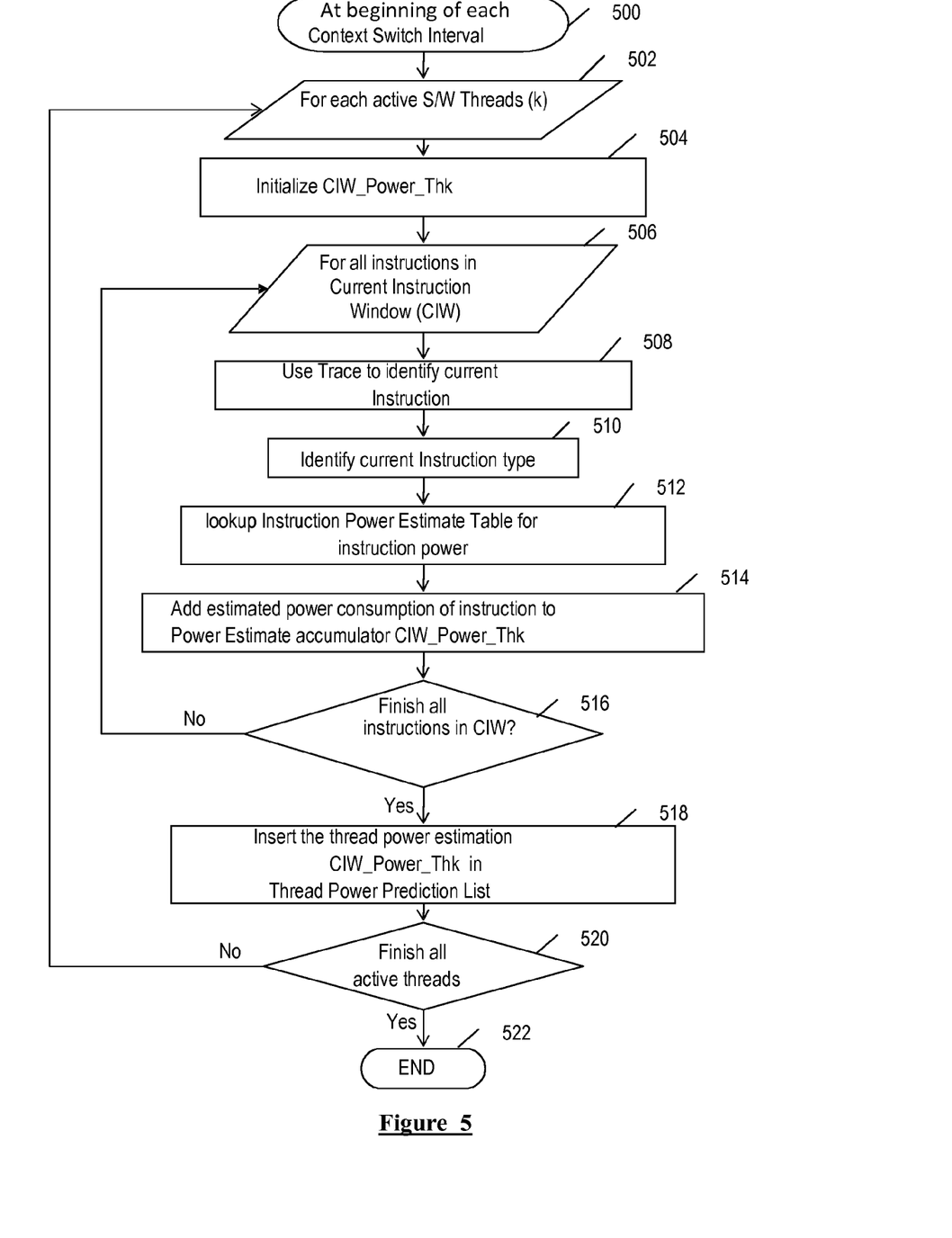
FIG. 5 shows a flowchart for predicting the power consumed by each thread within a specific instruction window according to certain embodiments of the invention.

FIG. 5 shows a flowchart for predicting the power consumed by each thread within a specific instruction window.

The power consumption prediction method is started at the beginning of each Context Switch interval in step 500. Alternatively, the method may be started at the beginning of every T context switch intervals where T is a predefined number.

For each thread k (step 502), the corresponding Estimated Power Consumption Register CIW_Power_Th$_k$ (designated by reference number 16 in FIG. 1) is initialized in step 504, for example to zero.

For each identified instruction that is expected to be executed in the Current Instruction Window (CIW), steps 506 to 510 use the thread trace 22 to identify this current instruction as well as its instruction type. More specifically, for each thread trace 22, the instructions are cycled from the last position identified by CIW counter until the end of the Instruction Window (IW). The instruction type of each instruction is identified from the trace. To identify the instruction type, the instruction type identifier 21 decodes each instruction identified for thread k and identifies its type based on the operation code "opcode" designed in the processor ISA. The instruction type is used to index the instruction Power Estimate Table 22 and retrieve the instruction power estimate corresponding to the current instruction in step 512. The value of power consumption of each instruction can be obtained independently by characterizing the instruction itself in a suitable setup. The Power Estimate Table 22 may be a lookup table where the index represents instruction opcode (and possibly more indexes, depending on required complexity/accuracy) and the corresponding power consumption value is read.

In step 514, the instruction power estimate corresponding to the current instruction is then accumulated in the Power estimate accumulator CIW_Power_Th$_k$ (23).

Steps 506 to 514 are repeated for all instructions identified in the Current Instruction Window (CIW). Accordingly, the power estimated for all instructions in the current Instruction Window is accumulated in the accumulator CIW_Power_Th$_k$. When all the CIW instructions of the Instruction Window in the thread trace have been processed (step 516), the accumulated value CIW_Power_Th$_k$ obtained for thread k instructions in the current instruction window CIW is added to the corresponding entry of Thread Power Prediction table 18, and the next thread identified by its thread identifier Thread$_{ID}$ is processed by repeating steps 502 to 518. The method of estimated power consumption expected for the current instruction window for each active thread is terminated when all active threads have been processed (step 520). The Thread Power Prediction List 18 thus obtained will be used to decide whether a thread is eligible to be executed or not.

This Thread Power Prediction List 18 is updated according to the process of FIG. 5 at the beginning of every Context switch interval. The CIW counter may be adjusted to correctly offset where in the trace the thread will next execute. This may be done by keeping track of how many instructions executed each Context Switch and then adjust the CIW counter accordingly.

Figure 6:
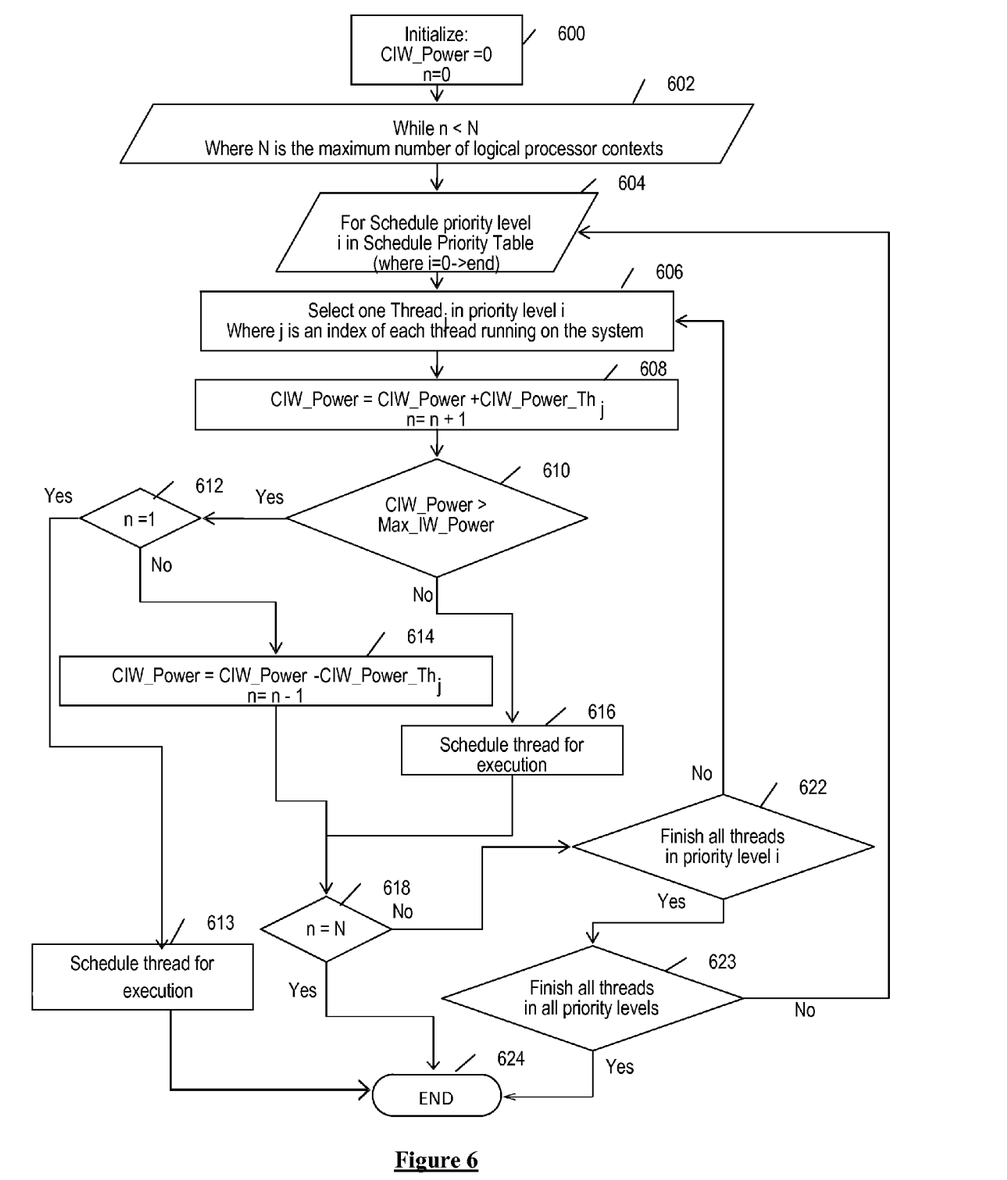
FIG. 6 shows a flowchart for selecting a set of N threads to be scheduled according to certain embodiments of the invention.

FIG. 6 shows a flowchart for selecting N candidate threads to be scheduled for each context switch interval on the microprocessor.

The thread selection uses the information maintained in the Thread Power Prediction List 19 and in the Schedule Priority table 14.

In step 600, the parameter CIW_Power representing the power consumption estimate for the Current Instruction Window for all scheduled jobs/threads in the context switch interval is initialized for example to zero. A counter n of the number of logical processor contexts is also initialized.

Steps 604 to 623 are repeated as long as counter n is less than the maximum number of logical processor contexts N (condition checked in step 602.

Step 604 processes each Schedule priority level i in the schedule priority table 14, where i ranges from 0 to an end value.

For the current priority level i, one thread j identified by each identifier thread$_j$ is selected in step 606.

In step 608, for the selected thread j associated with the current priority level j, the power consumption estimate for the Current Instruction Window CIW_Power is computed by adding its current value (initially set to zero) to the total power consumption estimated for thread j in the Current Instruction Window CIW_Power_Th$_j$.

Step 608 further increments the counter n of logical processor contexts counter.

In step 610, it is determined if the total power consumption estimate (also referred to as total power consumption indicator) for the Current Instruction Window CIW_Power exceeds the power threshold Max_IW_Power.

If the power threshold is reached it is determined if the logical processor contexts counter n is equal to 1 in step 612. If the condition of step 612 is satisfied, this means that the power of the job/thread in the first priority level CIW_Power_Th$_j$ exceeds Max_IW_Power, and then only this thread is selected, scheduled and executed in step 613 to avoid starvation for that particular job/thread, and the process is terminated in step 624. If the power threshold has been exceeded but the condition of step 612 is not satisfied, the current thread j is not scheduled for execution and its power contribution is subtracted from the total power consumption estimate CIW_Power in step 614. More specifically, the power consumption estimate for the Current Instruction Window CIW_Power is updated by subtracting to its current value the power consumption estimated for thread j in the Current Instruction Window CIW_Power_Thj (CIW_Power=CIW_Power−CIW_Power_Thj) and decrementing n (n=n−1).

If it is determined that the power threshold Max_IW Power is not exceeded in step 610, the current thread thread j is scheduled for execution in step 616.

The processing of the current thread j for the current priority level i is thus completed. In step 618 (following steps 614 or 616), it is determined if all N logical processor contexts have been occupied with jobs/threads (n=N). If so the process is stopped in step 624. Otherwise, step 622 checks if all threads associated with the current priority level i have been processed and if not, steps 606 to 618 are repeated for the next thread associated with the current priority level i. If all threads associated with the current priority level i have been processed (step 623), and not all priority levels have been processed (condition checked in step 623), the selection loop is repeated for the next priority level according to ascending priority level order. In the embodiment of the invention providing a schedule priority table 14 sorted in ascending order, the next priority level corresponds to the next entry i+1 in schedule priority table 14. If step 623 determines that all priority levels have been processed, the selection process is stopped in step 624.

The selection method in accordance with the various embodiments of the invention processes the sets of thread associated with the priority levels in the schedule priority table 14, according to ascending priority level order and for each considered thread cumulate the thread power consumption estimate induced by the thread in CIW_Power parameter until the power threshold Max_IW_Power is exceeded. The threads which power consumption estimate causes the total power consumption estimate CIW_Power to reach the power threshold Max_IW_Power is not added to the selection of candidate threads. The other processed threads are selected for scheduling and execution, until all N logical processor contexts are occupied with jobs/threads.

The job scheduling method according to the embodiments of the invention guides OS thread scheduling in multi-core and multi-threaded microprocessors by prioritizing the different active threads of applications/jobs running, based on their power consumption history, and selecting, based on the priority information a subset of threads for scheduling. The selected threads form the least power consuming set of threads to schedule for the next Context Switch.

The dynamic changes in priority levels of the threads both guarantees the forward progress of each thread, thereby preventing thread starvation of high power consumption threads, and at the same time increases the likelihood that the processor will run on lower peak power and also lower average power levels.

The invention applies not only to multi-core processors but also to multi-threaded processors and more generally to any processor in which more than one thread runs on each core.

The invention is further adapted to schedule threads for which power consumption may vary during their execution.

The invention also ensures that threads do not block others for extended period of time. The power accumulation technique according to this invention makes it possible to avoid thread starvation and to balance the workload execution progress using balanced power consumption levels, which prevents long-running, low-power threads from blocking other threads for an extended period of time.

The invention is not limited to environments where workload is profiled in advance and where the processor power behaviour depends solely on the instruction type being executed. In environments where workload is profiled in advance, the power estimate is predicted for instruction window ahead to avoid exceeding the peak power for the next instruction window. In other environments where workload profiling is not possible, power/thermal level monitoring techniques may be used to detect whether the peak power is to be reached or not and accordingly thread throttling decision could be taken to prevent exceeding the peak power threshold. In thread throttling applications of the invention, the most power consuming thread can be selected to be gated from further pulling more instruction into the processor pipeline to force reducing the peak power consumption level. In such situations, throttling of the thread will continue until the next context switch interval.

The invention can take the form of an entirely hardware embodiment, an entirely software embodiment or an embodiment containing both hardware and software elements. In particular it will be appreciated that while FIGS. 1 and 2 are presented in the form of hardware, exactly equivalent effects could be achieved in software. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A computer-implemented method for scheduling a number of threads among a set of active threads in each context switch interval in a multi-threaded/multi-core processor having a given instruction window, comprising:
    determining an actual power consumption of each running thread during a given context switch interval;
    associating a priority level with each of the active threads based on the actual power consumption determined for each running thread, wherein a lower, actual power consumption is associated with a higher priority;
    predicting a new power consumption expected for each of the active threads during a next context switch interval in a current instruction window by determining a power consumption estimate for a number of instructions expected to be executed for each of the active threads; and
    selecting a set of one or more threads among the active threads to be scheduled based on the priority level associated with each of the active threads and the new power consumption predicted for each of the active threads in the current instruction window, wherein, in response to determining that a total power consumption estimate for the set of one or more threads including a new thread is greater than a predefined power threshold and that there is one logical processor context, selecting the new thread to execute without any other threads in the set of one or more threads.

2. The method of claim 1, wherein associating the priority level further comprises:
    maintaining a thread priority data structure, wherein each entry of the thread priority data structure is associated with a given priority level, and wherein each entry stores a set of thread identifiers that identify the active threads having the given priority level associated with the entry, and wherein the thread priority data structure is updated in response to a predefined thread related event.

3. The method of claim 2, wherein the thread priority data structure is updated in response to one of a thread arrival and termination.

4. The method of claim 2, further comprising:
    in response to an update, sorting the thread priority data structure according to the given priority level associated with each entry.

5. The method of claim 1, wherein the actual power consumption determined for a running thread represents power consumed during execution of instructions assigned to that running thread during the given context switch interval.

6. The method of claim 5, wherein the processor comprises at least one power counter for measuring the power consumed during the execution of the instructions assigned to that running thread during the given context switch interval.

7. The method of claim 1, wherein predicting the new power consumption expected for each of the active threads in the current instruction window further comprises:
for each instruction of the number of instructions expected to be executed for an active thread in the current instruction window, identifying a current instruction type; and determining a predefined power consumption estimate associated with the current instruction type; and
accumulating the predefined power consumption estimate determined for each instruction expected to be executed for the active thread in the current instruction window to obtain the power consumption estimate for the number of instructions.

8. The method of claim 1, wherein the predicted new power consumption determined for each of the active threads in the current instruction window is maintained in a thread power prediction list comprising an entry for each thread.

9. The method of claim 1, wherein selecting the set of threads among the active threads to be scheduled further comprises:
iteratively pre-selecting each of the active threads to be a candidate thread according to an order based on the priority level associated with each of the active threads until a number of logical processor contexts have been occupied; and
for each candidate thread,
updating a total power consumption indicator by adding the new power consumption predicted in the current instruction window for the candidate thread to a current value of the total power consumption indicator;
determining whether the total power consumption indicator is less than the predefined power threshold;
in response to determining that the total power consumption indicator is less than the predefined power threshold, selecting the candidate thread for scheduling.

10. The method of claim 9, further comprising:
in response to determining that the total power consumption indicator exceeds the predefined power threshold, updating the total power consumption indicator by subtracting the new power consumption predicted in the current instruction window for the candidate thread from the current value of the total power consumption indicator.

11. A computer program product for scheduling a number of threads among a set of active threads in each context switch interval in a multi-threaded/multi-core processor having a given instruction window, comprising:
a computer-readable medium storing program code, wherein the computer-readable medium is not a signal and wherein the program code, when executed by a computer, performs:
determining an actual power consumption of each running thread during a given context switch interval;
associating a priority level with each of the active threads based on the actual power consumption determined for each running thread, wherein a lower, actual power consumption is associated with a higher priority;
predicting a new power consumption expected for each of the active threads during a next context switch interval in a current instruction window by determining a power consumption estimate for a number of instructions expected to be executed for each of the active threads; and
selecting a set of one or more threads among the active threads to be scheduled based on the priority level associated with each of the active threads and the new power consumption predicted for each of the active threads in the current instruction window, wherein, in response to determining that a total power consumption estimate for the set of one or more threads including a new thread is greater than a predefined power threshold and that there is one logical processor context, selecting the new thread to execute without any other threads in the set of one or more threads.

12. The computer program product of claim 11, wherein, when associating the priority level, the program code, when executed by the computer, further performs:
maintaining a thread priority data structure, wherein each entry of the thread priority data structure is associated with a given priority level, and wherein each entry stores a set of thread identifiers that identify the active threads having the given priority level associated with the entry, and wherein the thread priority data structure is updated in response to a predefined thread related event.

13. The computer program product of claim 12, wherein the thread priority data structure is updated in response to one of a thread arrival and termination.

14. The computer program product of claim 12, wherein the program code, when executed by the computer, further performs:
in response to an update, sorting the thread priority data structure according to the given priority level associated with each entry.

15. The computer program product of claim 11, wherein the actual power consumption determined for a running thread represents power consumed during execution of instructions assigned to that running thread during the given context switch interval.

16. A computer system for scheduling a number of threads among a set of active threads in each context switch interval, comprising:
a multi-threaded/multi-core processor having a given instruction window; and
a storage device connected to the multi-threaded/multi-core processor, wherein the storage device has stored thereon program code, and, wherein the multi-threaded/multi-core processor is configured to execute the program code to perform operations, wherein the operations comprise:
determining an actual power consumption of each running thread during a given context switch interval;
associating a priority level with each of the active threads based on the actual power consumption determined for each running thread, wherein a lower, actual power consumption is associated with a higher priority;
predicting a new power consumption expected for each of the active threads during a next context switch interval in a current instruction window by determining a power consumption estimate for a number of instructions expected to be executed for each of the active threads; and
selecting a set of one or more threads among the active threads to be scheduled based on the priority level associated with each of the active threads and the new power consumption predicted for each of the active threads in the current instruction window, wherein, in response to determining that a total power consumption estimate for the set of one or more threads including a new thread is greater than a predefined power threshold and that there is one logical processor context, selecting the new thread to execute without any other threads in the set of one or more threads.

17. The computer system of claim 16, wherein the operations for associating the priority level further comprise:
   maintaining a thread priority data structure, wherein each entry of the thread priority data structure is associated with a given priority level, and wherein each entry stores a set of thread identifiers that identify the active threads having the given priority level associated with the entry, and wherein the thread priority data structure is updated in response to a predefined thread related event.

18. The computer system of claim 17, wherein the thread priority data structure is updated in response to one of a thread arrival and termination.

19. The computer system of claim 17, wherein the operations further comprise:
   in response to an update, sorting the thread priority data structure according to the given priority level associated with each entry.

20. The computer system of claim 16, wherein the actual power consumption determined for a running thread represents power consumed during execution of instructions assigned to that running thread during the given context switch interval.

* * * * *